United States Patent [19]

Finkelstein et al.

[11] Patent Number: 5,206,654
[45] Date of Patent: Apr. 27, 1993

[54] PASSIVE AIRCRAFT MONITORING SYSTEM

[75] Inventors: Marc Finkelstein, Vienna, Va.; Martin J. Geesaman, Bowie; Thomas J. Lynch, Potomac, both of Md.

[73] Assignee: Hughes Aircraft Company, Los Angeles, Calif.

[21] Appl. No.: 886,112

[22] Filed: May 19, 1992

[51] Int. Cl.⁵ .............................. G01S 1/16; G01S 1/18
[52] U.S. Cl. ..................................... 342/410; 342/413
[58] Field of Search ............... 342/410, 411, 413, 418

[56] References Cited

U.S. PATENT DOCUMENTS

| | | |
|---|---|---|
| 3,704,465 | 11/1972 | Masak et al. |
| 4,301,455 | 11/1981 | Yetter. |
| 4,951,056 | 8/1990 | Cope et al. .......................... 342/29 |

Primary Examiner—Theodore M. Blum
Attorney, Agent, or Firm—Gordon R. Lindeen, III; Wanda Denson-Low

[57] ABSTRACT

A passive aircraft monitoring system (20) receives signals transmitted by an instrument landing system (14, 16) and reflected from aircraft (18). The Doppler shift in the reflected signals is used to calculate the position or velocity of the aircraft. Using the ILS 90 and 150 Hz signals reflected from the aircraft and comparing their magnitude, the altitude and lateral position of the aircraft can also be determined.

22 Claims, 2 Drawing Sheets

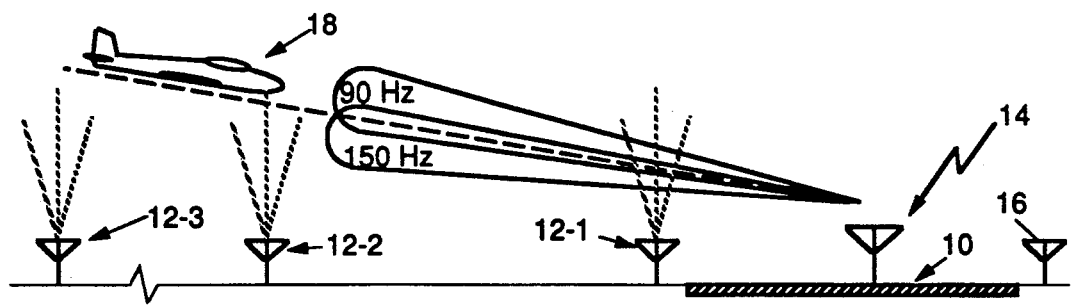
FIG. 1.
FIG. 2.
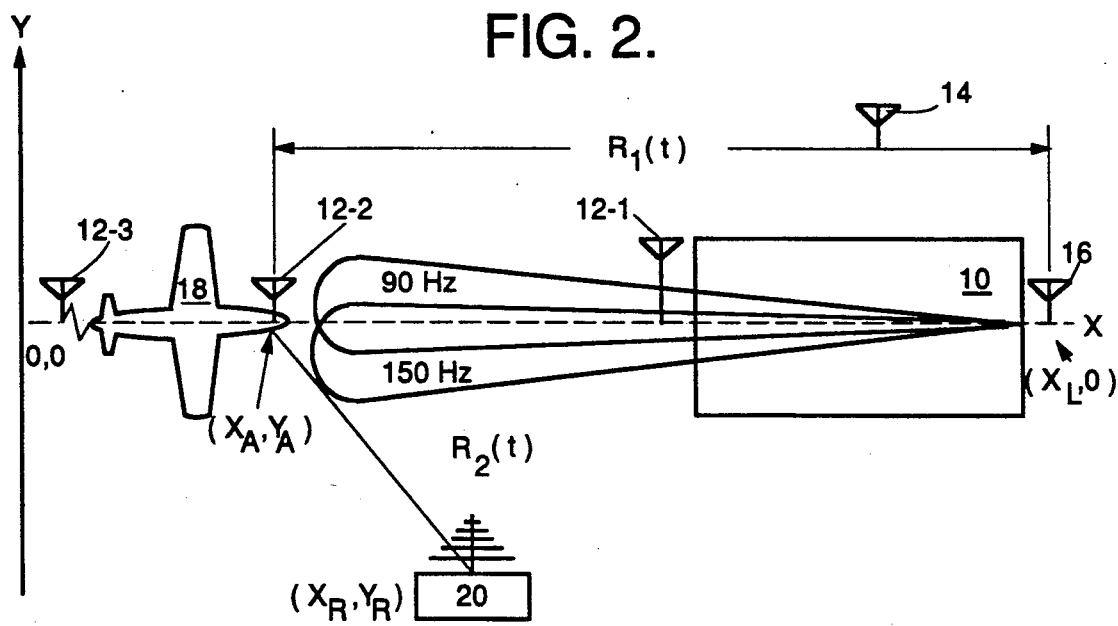
FIG. 3.
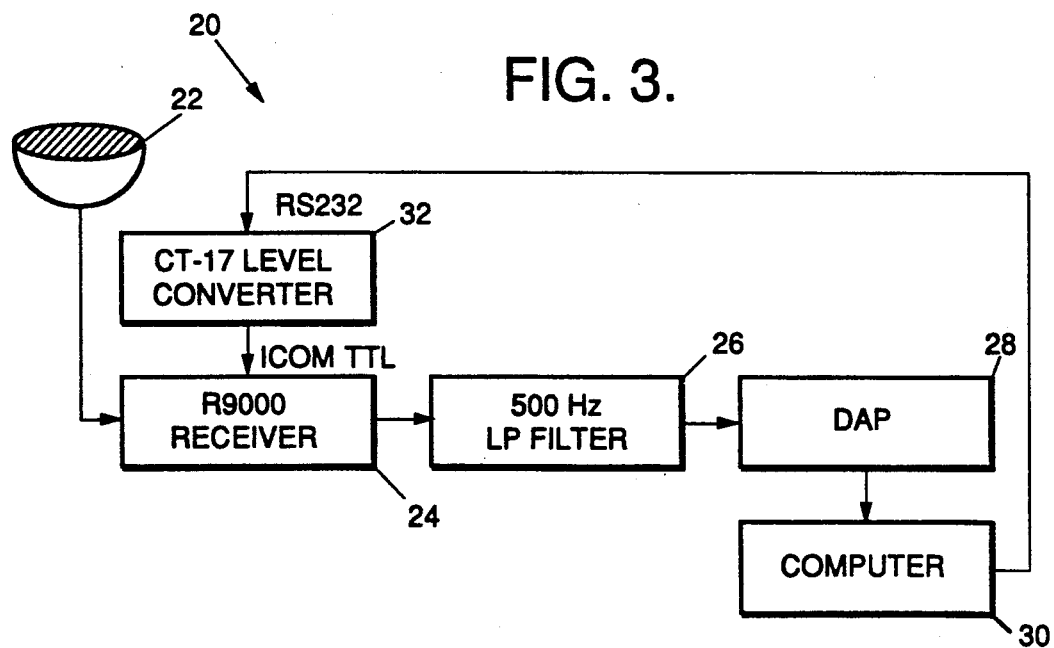

PASSIVE AIRCRAFT MONITORING SYSTEM

FIELD OF THE INVENTION

The present invention pertains to the field of aircraft monitoring systems and more particularly to a passive aircraft position and flight path monitoring system which uses signals reflected by an aircraft from an instrument landing system.

BACKGROUND OF THE INVENTION

Most airports currently use an airport surveillance radar system which scans the skies to monitor incoming and outgoing aircraft. However, this surveillance radar has an altitude limit below which it cannot detect aircraft. Just before landing and immediately after takeoff, the aircraft are monitored visually or through radio communications directly with the pilot. To assist aircraft in landing when visibility is poor, many airports have installed an instrument landing system (ILS) and marker beacons. The ILS allows an airplane to determine whether it is on the proper flight path for a proper landing on the assigned runway. The marker beacons are spaced out at predetermined distances from the start of the runway and indicate to the aircraft the distance to the runway. The ILS and marker beacons however are used only to indicate the aircraft's position to the aircraft itself and do not assist the airport tower or air traffic controllers.

SUMMARY OF THE INVENTION

The present invention allows an airport tower or an air traffic controller to monitor the positions of incoming and outgoing aircraft which are below the altitude range of an airport surveillance radar with minimal cost using existing radio frequency transmitters such as those which form the instrument landing system commonly used in most airports. In one embodiment, the invention encompasses a method for monitoring aircraft flying along an instrument landing system flight path. First, ILS signals reflected from aircraft flying along the ILS flight path are received, then digital samples of the reflected ILS signals received by the receiver are generated. A fast Fourier transform is performed on the digital samples converting the signals to the frequency domain. The Doppler frequency shift in the converted digital samples is determined and an attribute, for example, the range or speed of the aircraft, is calculated using the Doppler frequency shift. The ground speed can be determined by receiving and time tagging ILS marker beacon signals reflected from the aircraft in the ILS flight path. In addition, the reflections of the 90 and 150 Hz modulated signals transmitted from single ILS transmitters can be received. By comparing the magnitudes of the reflections of the two different signals, the position of the aircraft with respect to the two signals can be determined showing whether the aircraft is on the proper approach path to a runway.

BRIEF DESCRIPTION OF THE DRAWINGS

FIG. 1 is a diagram of a side view of a runway with an ILS showing an approaching aircraft and the glide slope and marker beacon transmitter signals.

FIG. 2 is a diagram of a top view of the same runway and ILS system showing an aircraft and the localizer antenna transmissions together with a monitoring system for implementing the present invention.

FIG. 3 is a block diagram of the monitoring system of FIG. 2; and

DETAILED DESCRIPTION OF THE INVENTION

Figure 4:
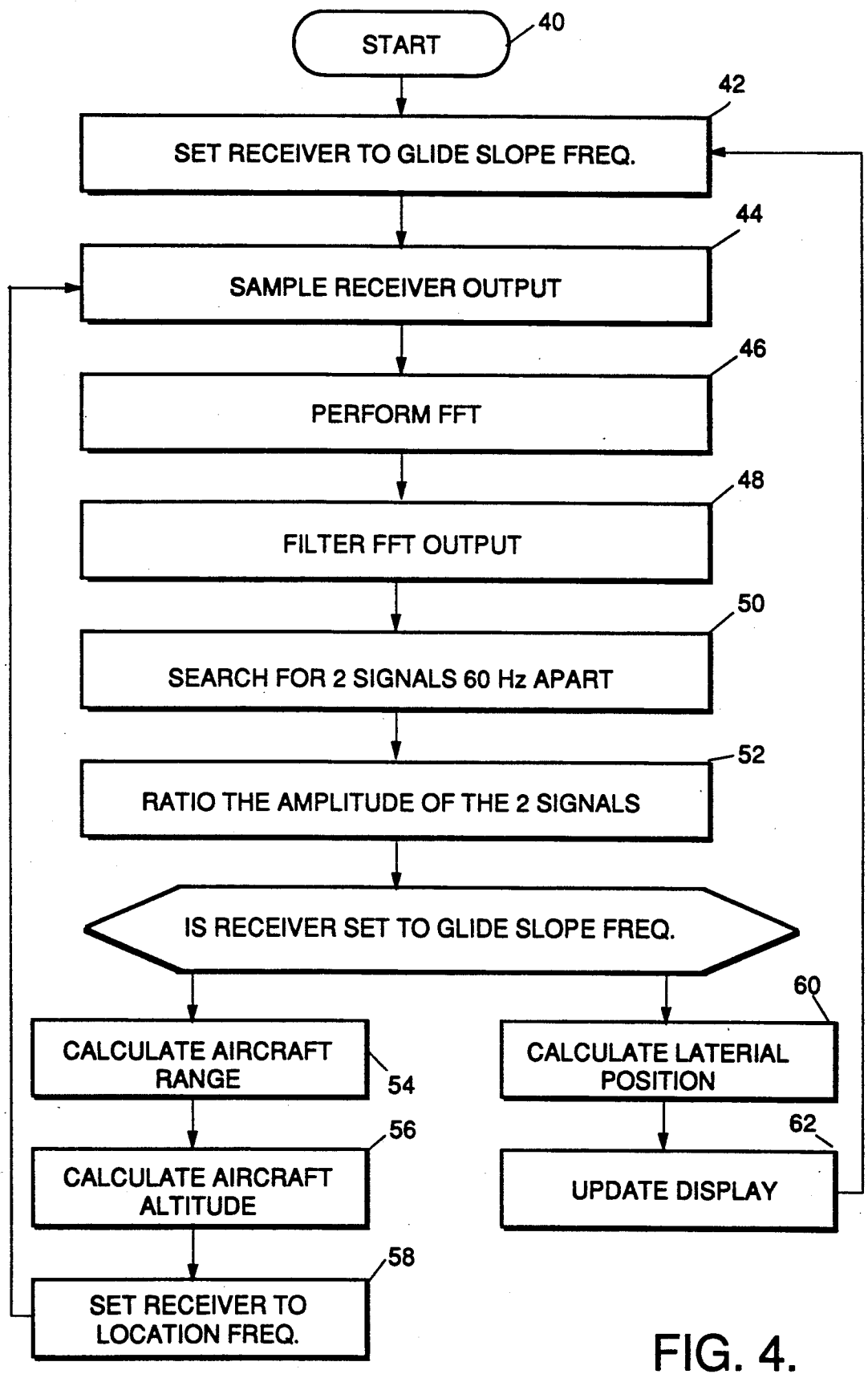
FIG. 4 is a flow diagram of an aircraft monitoring method according to the present invention.

Referring to FIG. 1, a typical airport with an instrument landing system (ILS) has a runway, 10, and a set of marker beacons, 12-1, 12-2 and 12-3, each located a specific predetermined distance from the beginning of the runway. The first beacon is typically located at the beginning of the runway. The second beacon is typically located 3500 feet from the beginning of the runway and the third beacon is located five miles from the beginning of the runway. According to the rules of the U.S. Federal Aviation Administration, the beacons transmit a signal at a frequency of 75 Mhz directly upwards. When an airplane passes over a beacon, the signal indicates to the pilot the distance to the runway. The ILS also has two transmitting antennas, a glide slope transmitting antenna, 14, and a localizer transmitting antenna, 16. The glide slope antenna transmits a 90 Hz and 150 Hz modulated signal on a carrier frequency selected from the range of 329 to 335 MHz. The 90 and 150 Hz signals are fan shaped and directed along the standard landing glide slope for the particular runway. The signals are vertically arranged so that comparing the relative amplitude of the two signals, the aircraft can determine whether it is centered between the two fan shaped signals and thereby whether it is at the proper altitude for the approved landing flight or approach path. Similarly, the localizer transmitting antenna transmits 90 and 150 Hz modulated signals on a carrier frequency chosen from the range of 108 to 112 MHz; however, these two fans are side by side as shown in FIG. 2 so that by comparing the magnitude of the two signals, the aircraft can determine whether it is on a flight path parallel to and centered on the runway in a horizontal plane. The localizer antenna is typically placed at the opposite end of the runway from the approaching aircraft and the glide slope antenna is typically placed beside the runway at a midpoint along the runway. To permit landings from either direction on the runway, as is common in most airports, the ILS just described is duplicated in the opposite direction; however, for simplicity only one set of ILS transmitting antennas and marker beacons is shown in FIGS. 1 and 2.

As shown in FIG. 2, according to the present invention, a passive monitoring system, 20, is placed to the side of the runway where it can detect signals reflected from aircraft approaching the runway. FIG. 2 shows an x-axis extending parallel to and through the center of the runway and a y-axis extending perpendicular to the runway with the origin of the two axes as shown in the figures. It is presently preferred that the passive monitoring system be located a distance of approximately five miles from the glide path on either side of the runway. Greater distances tend to impair signal reception and shorter distances limit accuracy. It is also located along a line parallel to the x-axis at the location where the greatest accuracy of monitoring information is obtained. Because of the bistatic geometry of the monitoring system, it is most accurately able to determine the position of aircraft when the aircraft are at the same x-axis position as the passive monitoring system. For maximum position accuracy at a position 5 miles from the end of the runway, along the x-axis, the system should also be located at this same 5 mile position along the x-axis and, 5 miles offset from the runway along the y-axis. The aircraft monitoring system of FIG. 2 is shown located directly offset from the center of the runway on the right-hand side, as viewed from the landing aircraft. However, as explained above, many different positions are possible.

As shown in FIG. 3, the aircraft monitoring system, 20, has an antenna, 22, designed to receive signals on carrier frequencies from 75 MHz to 335 MHz the range of the ILS described above. A conventional VHF/UHF antenna may be used. The antenna is coupled to a receiver, 24, which can be tuned to the relevant frequencies. In a typical airport installation, each ILS glide slope and localizer transmitter is tuned to a different frequency within the allotted range. For example, localizer antennas can be assigned any frequency in the range from 108 to 112 Mltz. Thus, in a two runway airport four different localizer carrier frequencies could be used, one for each landing direction of each runway. An Icom R9000 model receiver is presently preferred and has a sufficient tuning range. The receiver is tuned to a specific frequency and recovers the 90 and 150 Hz modulation signals from the glide slope or localizer antenna to which it is tuned. These signals are then processed by a low pass filter, 26, with a cutoff of about 500 Hz or less to minimize intermodulation cross products of the reflected ILS signals. From the low pass filter, the signals are sent to a digital acquisition processor, 28, for example, a Microstar Laboratory Model 2400 Processor. This processor converts the analog output of the receiver to digital samples and performs fast Fourier transforms on these samples to convert the signals from a time domain representation of the antenna's reception to a frequency domain representation. The frequency domain samples are then processed further by a computer, 30, which controls the digital acquisition processor as well as, through a level converter, 32, (from RS232 to TTL) the receiver. The level converter simply converts the microcomputer commands to a level appropriate for the receiver, in this case from RS232 level signals to TTL level signals. The Microcomputer can tune the receiver to any frequency within the receiver's range on command. The computer, 30, is presently a conventional microcomputer with a keyboard and display which has been programmed to implement the method of the present invention. The digital acquisition processor is typically installed as a card in the computer chassis. The computer can also be programmed to transmit any information obtained from the monitoring system to airport towers, air traffic controllers or the aircraft themselves using techniques well known in the art. Using reflections from aircraft which are within the range of the ILS and the monitoring system antenna, 22, the system can determine the Doppler shift in the ILS signals produced by the aircraft and from that determine an attribute of the aircraft, for example, the range or speed of the aircraft.

Referring to FIG. 2, each aircraft is a specific distance $R_1(t)$ from the localizer antenna which distance is a function of time due to the speed of the aircraft. If the localizer antenna is at the coordinates $(X_L, O)$ and the aircraft is at a position $(X_A, Y_A)$ then the distance from the aircraft to the localizer antenna is $(X_L - V_A t)$ where the $V_A$ is the velocity of the aircraft. The distance from the passive monitoring system's receiver at the coordinates $(X_R, Y_R)$ to the aircraft at $(X_A, Y_A)$ is given by equation (1) below.

$$R_2(t) = ((X_r - X_A)^2 + (Y_r - Y_A)^2)^{\frac{1}{2}} = ((X_r - V_A t)^2 + Y_r^2)^{\frac{1}{2}}$$

The Doppler shift is proportional to the time rate of change of the length of the total signal path $R(t) = R_1(t) + R_2(t)$, that is the total distance the signal must travel from the localizer transmitter to the aircraft to the passive monitoring system antenna. The proportionality is given by equation (2) below.

$$F_{Doppler} = \frac{1}{C} \frac{d}{dt} (R(t)) f_0$$

Where $F_{Doppler}$ is the frequency shift, C is the speed of light and $f_0$ is the frequency of the signal transmitted by the localizer antenna. Applying the above relations R(t) is given by equation (3) below.

$$R(t) = X_L - V_A t + ((X_r - V_A t)^2 + Y_r^2)^{\frac{1}{2}}$$

and accordingly the Doppler shift is given by equation (4) below.

$$F_{Doppler}(t) = -\frac{V_A}{C} \left[ 1 + \frac{(X_r - V_A t)}{((X_r - V_A t)^2 + Y_r^2)^{\frac{1}{2}}} \right] f_0$$

If the coordinate system is chosen so that $V_A(t)$ is the x-coordinate $(X_A)$ of the current aircraft position and the y-coordinate of the aircraft position is always 0 then equation 4 can be simplified as follows.

$$F_{Doppler}(t) = -\frac{V_A}{C} \left[ 1 + \frac{(X_r - X_A)}{((X_r - X_A)^2 + Y_r^2)^{\frac{1}{2}}} \right] f_0$$

in which $f_0$, $V_A$, C, $X_r$, $Y_r$ are all constants. Accordingly, the Doppler shift is a function only of aircraft speed and aircraft position. If the position of the aircraft is known then the speed can be precisely determined. Alternatively if the aircraft speed is known, its position can be precisely determined.

Commercial aircraft typically have a specified landing speed which is determined by the manufacturer for the particular model of aircraft. To determine the aircraft position it can be assumed that the aircraft is following the manufacturer's recommendations and approaching at the recommended speed. To a first approximation, this speed can be assumed to be constant for the aircraft's approach to a runway. It has been determined that using manufacturer's recommended landing speeds, position can be determined to an accuracy of within ¼ mile. Speed can also be determined by observing reflections from marker beacons. When an aircraft is directly over a marker beacon, the reflection from that beacon will be at an amplitude peak. By detecting marker beacon signals at the monitoring system antenna, 22, the time at which an aircraft passes over each marker beacon can be determined. Since the positions of the marker beacons are known, the speed of the aircraft can be calculated based on the distance between the marker beacons and the time required for the aircraft to travel between the marker beacons. In the alternative, when an aircraft passes over a marker beacon and the reflected signal from that beacon is detected, the position of the aircraft is known and the aircraft's speed can be calculated from the Doppler shift in reflections from the localizer or glide slope antenna. Aircraft speed can also be determined by radioing the aircraft directly to determine its own estimate of its ground speed from onboard instruments. While the position and speed determination based on the Doppler shift has been described with respect to the localizer transmitter, they can also be determined from the glide slope transmitter. The localizer transmitter was chosen above for the simpler geometry. The localizer transmitter is typically located on the x-axis. In practice, it is preferred to use glide slope transmitter reflections because of the higher carrier frequency of the glide slope transmitter. The higher frequency provides higher resolution in the Doppler shift allowing greater accuracy for the system as a whole.

In addition to determining the Doppler shift, the passive monitoring system, because it receives both the 90 and 150 Hz modulations, can determine the relative amplitude of the reflections of these signals to determine whether an aircraft is centered between the 90 and 150 Hz modulation fanbeams. To do this, the two reflected signals are simply identified for a particular aircraft and their amplitudes are determined and compared. For example, if the 150 Hz signal is stronger than the 90 Hz signal then the aircraft is located closer to the center of the 150 Hz fanbeam than the 90 Hz fanbeam. The precise amount of dislocation from the center of the two beams can be determined by comparing the relative amplitudes of the reflected signals. By comparing reflections of the 90 and 150 Hz signals, and knowing the aircraft's distance from the runway, estimates of the aircraft altitude as well as the aircraft's lateral offset can be made. This, in effect, duplicates the work of an aircraft's onboard ILS equipment making this valuable information available to the airport tower.

FIG. 4 shows a preferred method for implementing the present invention. The system is first initialized, 40. Then the microcomputer sets the receiver, 24, to the glide slope transmitting antenna frequency for the runway and landing path which is to be monitored, 42. This is done by instructions transmitted through the level converter, 32, directly to the receiver, 24. In practice, because of the Doppler frequency shift of the reflected signals which are to be received, the receiver must be scanned through a series of frequencies centered around the desired glide slope transmitting frequency. Different aircraft on the same flight path will reflect the signals at different shifted frequencies. Tuning the receiver allows the 150 and 90 Hz modulations to be transmitted through the low pass filter, 26, to the digital acquisition processor, 28. The processor samples the receiver output, 44, and performs a fast Fourier transform, 46, on the time domain signals. The digital frequency domain signals are then filtered in the microcomputer, 30. First, the signals received directly from the ILS transmitter are zeroed out since the system is interested only in reflections from incoming aircraft. Then mean noise power is subtracted out of the data and a 6 Hz wide integration is performed to smooth the data. The computer then searches for sets of two signals which are 60 Hz apart, 50. The 60 Hz difference represents the difference between the 150 and 90 Hz modulations of the ILS transmitters. The precise frequency of these modulations as well as their carriers will be shifted however because of the Doppler effect. For each set of signals found, the amplitudes of the two signals are ratioed, 52, and the information is stored. Because of the bistatic nature of the geometry as shown in FIG. 2 and demonstrated by equations 1 through 5, the Doppler frequency shift changes more as a function of geometry than the velocity of the airplane. This means that several different airplanes on the same flight path with similar velocities can be independently monitored by a single system provided that their locations are different. Doppler shifts may also be generated by slower moving vehicles, for example, service vehicles moving around the airport. The positions of these vehicles can also be monitored using the present invention. The range of all aircraft or the distance from the runway is calculated by the Doppler shift of the modulated frequencies from the original values of 90 and 150 Hz, 54. Given the range and the glide slope fanbeams geometry, the amplitude ratio of the two 60 Hz separated signals reflected from the glide slope transmitter is used to calculate the altitude of the airplane as described above, 54.

The computer then sets the receiver to receive the localizer frequency signals, 58. The receiver output is again sampled, 44, a fast Fourier transform, 46, is performed, the FFT samples are filtered, 48, the two 60 Hz separated signals are found, 50, for each monitored aircraft and vehicle and the amplitudes of these two signals are ratioed, 52. Since the Doppler shift precision is higher with the higher frequency glide slope transmitter reflections, the Doppler shift information from the localizer transmitter is preferably not used. However, it can be used, for example, to check the accuracy of the glide slope reflections. When the receiver is tuned to the localizer frequency the lateral position of the aircraft, that is their displacement with respect to the y-axis, as shown on FIG. 2 is determined from each set of ratioed amplitude signals, 60, and finally all of the information is used to update the computer display, 62, or for transmitting this information to another location. The display is preferably somewhat similar to FIGS. 1 and 2 showing the runway and representations of all monitored aircraft and their relative positions with respect to the runway. Positions can be shown in altitude and lateral distance from the runway and in range. After the display has been updated, the computer can monitor glide slope and localizer frequencies for other runways or can repeat the process again for the same runway. Each aircraft's time of arrival can also be calculated based on the range of the airplane and its velocity. As discussed above, several passive monitoring systems can be used at different distances from the runway in order to enhance the accuracy of the system. In this case, the computers preferably communicate with each other to determine the most accurate information to transmit for the display. In addition, in the case of multiple runways, multiple monitoring systems can be used so that each system can monitor a single runway independent of the other systems. Alternatively, because the ILS frequencies for each runway are different, a single system can be used to monitor several different runways at the same time.

While only a few embodiments have been discussed above, a variety of modifications and adaptations can be made without departing from the scope of the present invention. The invention can be applied not only to the U.S. ILS discussed above but to any location in which a runway is located near a transmitter and which allows for a bistatic geometry including, for example, the microwave landing system currently being studied by the Federal Aviation Administration in the United States.

The invention can also be used to monitor aircraft which are not on a landing or takeoff flight path. The present invention can easily be implemented using conventional existing hardware and without modifications to airport landing systems or aircraft. The system can be used to supplement existing systems or to provide a surveillance capability beyond that of the standard airport surveillance radars currently in use. The invention is not to be limited to the embodiments described above but only by the scope of the claims below.

What is claimed is:

1. A method for monitoring aircraft on a runway approach or departure flight path wherein the aircraft are subject to electromagnetic radiation signals of a landing system, the signals having a known frequency and source comprising:
   receiving, at a location offset laterally from the runway, the signals reflected from the aircraft flying along the flight path;
   generating digital samples of the reflected signals received by the receiver;
   performing a Fourier transform on the digital samples, thereby converting the signals to the frequency domain;
   determining the Doppler frequency shift in the converted digital samples; and
   calculating an attribute of the aircraft using the Doppler frequency shift of the reflected signals.

2. The method of claim 1 further comprising, after the step of performing a Fourier transform, the step of discriminating signals reflected from different aircraft and wherein the step of calculating the range comprises calculating the range separately for each aircraft.

3. The method of claim 1 wherein the step of calculating an attribute comprises calculating the range of the aircraft using the Doppler frequency shift.

4. The method of claim 3 wherein the step of calculating the range comprises determining the groundspeed of the aircraft and applying the groundspeed to the Doppler frequency shift.

5. A system for monitoring aircraft flying along an Instrument Landing System (ILS) flight path comprising:
   a receiver for receiving ILS signals reflected from aircraft flying along the ILS flight path;
   an analog to digital converter for generating digital samples of the reflected ILS signals received by the receiver;
   a digital signal processor for performing a Fourier transform on the digital samples, converting the signals to the frequency domain; and
   a processing unit for determining the Doppler frequency shift in the converted digital samples and calculating an attribute of the aircraft from which the signals are reflected using the Doppler frequency shift.

6. The system of claim 5 wherein the attribute comprises the range of the aircraft.

7. The system of claim 6 wherein the processing unit calculates the range by determining the groundspeed of the aircraft and applies the groundspeed to the Doppler frequency shift.

8. The system of claim 5 wherein the attribute comprises the groundspeed of the aircraft.

9. The system of claim 5 further comprising, a discriminator for discriminating signals reflected from different aircraft and wherein the processing unit calculates the range separately for each aircraft.

10. The system of claim 5 further comprising a switch coupled between the arithmetic unit and the receiver for switching the frequencies to which the receiver is tuned.

11. A method for monitoring aircraft flying along an Instrument Landing System (ILS) flight path comprising:
    receiving ILS signals reflected from aircraft flying along the ILS flight path;
    generating digital samples of the reflected ILS signals received by the receiver;
    performing a Fourier transform on the digital samples, thereby converting the signals to the frequency domain;
    determining the Doppler frequency shift in the converted digital samples; and
    calculating an attribute of the aircraft using the Doppler frequency shift of the reflected signals.

12. The method of claim 11 wherein the step of calculating an attribute comprises calculating the range of the aircraft using the Doppler frequency shift.

13. The method of claim 12 wherein the step of calculating the range comprises determining the groundspeed of the aircraft and applying the groundspeed to the Doppler frequency shift.

14. The method of claim 13 wherein the step of determining the groundspeed of the aircraft comprises:
    receiving ILS marker beacon signals reflected from the aircraft in the ILS flight path;
    comparing the times at which the reflected beacon signal are received to determine the aircraft speed between the respective beacon transmitters.

15. The method of claim 11 wherein the step of calculating an attribute comprises calculating the groundspeed of the aircraft using the Doppler frequency shift.

16. The method of claim 11 further comprising, after the step of performing a Fourier transform, the step of discriminating signals reflected from different aircraft and wherein the step of calculating the range comprises calculating the range separately for each aircraft.

17. The method of claim 11 wherein the step of receiving ILS signals comprises receiving reflections of two different frequency components transmitted from a single ILS transmitter.

18. The method of claim 17 wherein the step of discriminating signals comprises searching the converted digital samples for sets of two frequency components having a difference representative of the difference between the two different frequency components transmitted from the single ILS transmitter.

19. The method of claim 17 further comprising the step of comparing the magnitudes of the reflections of the two different frequency components for determining the position of the aircraft with respect to the two signals transmitted from the ILS transmitter.

20. The method of claim 19 wherein the step of comparing comprises comparing the magnitude of the 90 and 150 Hz glide slope transmitter reflections for determining the altitude of the aircraft with respect to the ILS flight path.

21. The method of claim 19 wherein the step of comparing comprises comparing the magnitude of the 90 and 150 Hz localizer transmitter reflections for determining the lateral approach angle of the aircraft with respect to the ILS flight path.

22. A method for determining the groundspeed of aircraft flying along an Instrument Landing System (ILS) flight path comprising:
    receiving ILS marker beacon signals reflected from the aircraft in the ILS flight path;
    comparing the times at which the reflected beacon signals are received to determine the aircraft speed between the respective beacon transmitters.

* * * * *